United States Patent [19]
van Veldhuisen et al.

[11] Patent Number: 6,000,526
[45] Date of Patent: Dec. 14, 1999

[54] DOSING APPARATUS FOR EGGS OR LIKE SUBSTANTIALLY ROUND ARTICLES

[75] Inventors: Willem van Veldhuisen; Gerrit van de Pol, both of Lunteren, Netherlands

[73] Assignee: FPS Food Processing Systems B.V., Netherlands

[21] Appl. No.: 08/906,978

[22] Filed: Aug. 6, 1997

[30] Foreign Application Priority Data

Aug. 7, 1996 [NL] Netherlands ........................... 1003761

[51] Int. Cl.$^6$ .................................................. B65G 27/00
[52] U.S. Cl. .......................................... 198/446; 198/445
[58] Field of Search .................................... 198/446, 445, 198/452, 453, 389, 390

[56] References Cited

U.S. PATENT DOCUMENTS

| 2,679,309 | 5/1954 | Reading | 198/446 |
|---|---|---|---|
| 3,342,012 | 9/1967 | Reading | 198/446 |
| 3,439,791 | 4/1969 | Matthews et al. | 198/446 |
| 3,613,860 | 10/1971 | Waite | 198/446 |
| 3,749,227 | 7/1973 | Denherder | 198/446 |
| 3,792,768 | 2/1974 | Cheeseman | 198/445 |
| 4,042,100 | 8/1977 | Morrone . | |
| 4,049,111 | 9/1977 | Mosterd . | |
| 4,129,207 | 12/1978 | Cupp | 198/445 |
| 4,281,757 | 8/1981 | Morton | 198/369.2 |
| 4,776,465 | 10/1988 | McEnvoy et al. | 198/364 |
| 4,848,558 | 7/1989 | Rechsteiner | 198/369.2 |
| 4,966,272 | 10/1990 | Raudat | 198/446 |
| 5,078,255 | 1/1992 | Haley | 198/369.2 |
| 5,228,550 | 7/1993 | Munch | 198/453 |

FOREIGN PATENT DOCUMENTS 1481370  3/1967  Germany .

*Primary Examiner*—William E. Terrell
*Assistant Examiner*—Khoi H. Tran
*Attorney, Agent, or Firm*—Larson & Taylor

[57] ABSTRACT

A dosing apparatus for eggs or like substantially round or ellipsoid articles, comprising at least one endless conveyor having a conveying face above which guiding elements are disposed intended for ordering an unordered flow of articles into a number of ordered flows each having the width of one article, wherein a main surface of each of the guiding elements includes, with the conveying face part extending between the opposite guiding elements, an angle greater than 90°, enabling the articles to be gradually pushed upwards along the guiding elements, wherein at the inlet of the dosing apparatus, said dosing apparatus comprises one conveying channel and wherein, viewed in the conveying direction, the number of conveying channels doubles each time, so that at a discharge end of the dosing apparatus the width of the conveying channels at that location is such that, viewed in conveying direction, the articles can only travel therein in file.

21 Claims, 3 Drawing Sheets

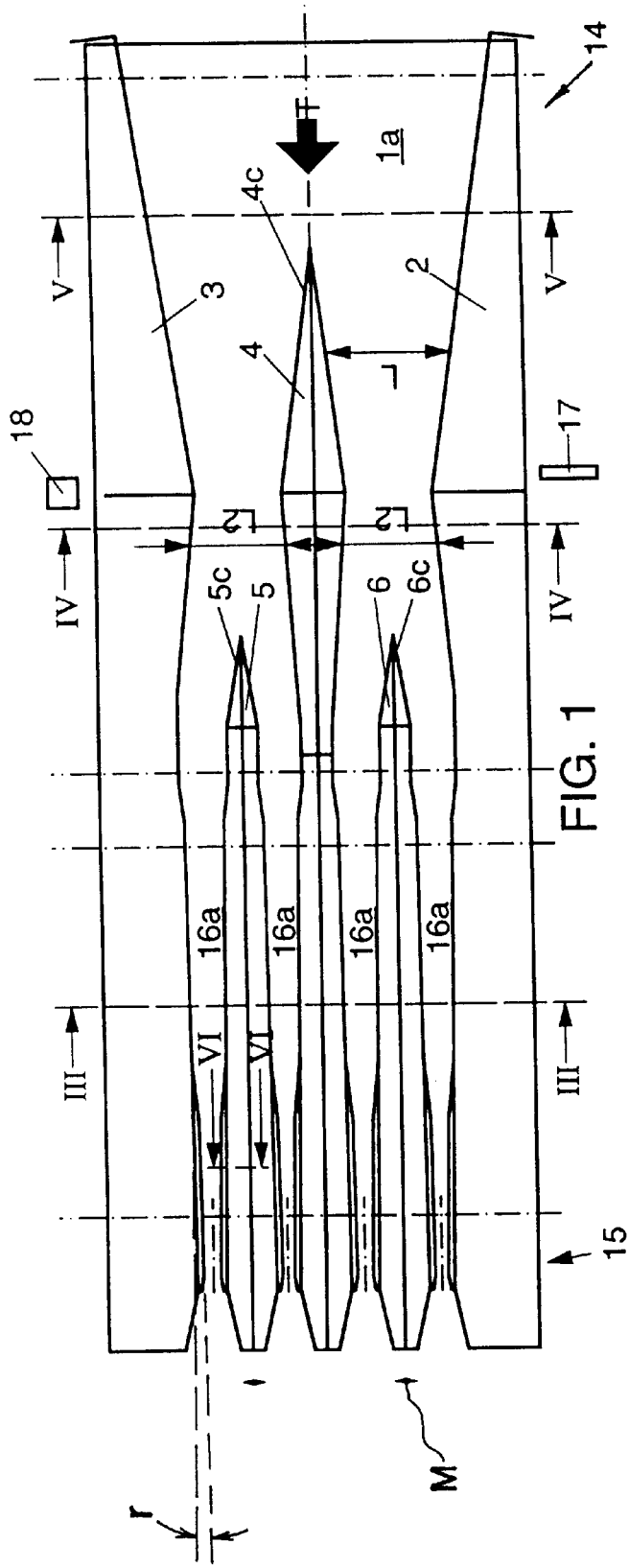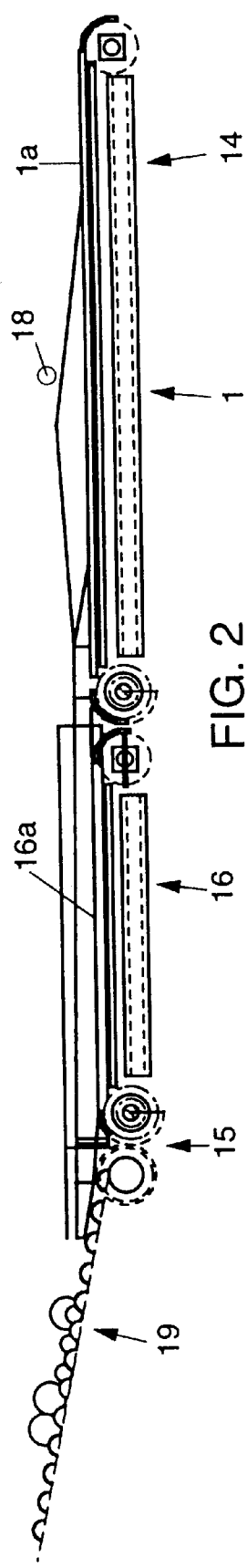
FIG. 1
FIG. 2

DOSING APPARATUS FOR EGGS OR LIKE SUBSTANTIALLY ROUND ARTICLES

The invention relates to a dosing apparatus for eggs or like substantially round or ellipsoid articles, comprising at least one endless conveyor having a flat, substantially horizontally disposed conveying face, wherein guiding elements are disposed above the at least one conveyor, intended for ordering an unordered flow of articles into a number of ordered flows each having the width of one article, wherein in each case two opposite guiding elements bound, together with a part of the conveying face that extends between the guiding elements, a conveying channel, which conveying channel has a cross-sectional profile having a channel bottom and channel walls, wherein the channel bottom is formed by the conveying face and the channel walls are formed by the two opposite guiding elements.

Such dosing apparatus is known from DE-A-1 481 370. The drawback of the known apparatus is that the guiding elements extend, at least adjacent the upstream ends thereof, substantially perpendicularly to the conveying face, so that the eggs bump against it. As a consequence of the bumping, the eggs may become damaged. It is moreover a drawback that it is not guaranteed that the eggs at the outlet of the dosing apparatus are evenly distributed over the different conveying channels. In the known apparatus, it is very well possible that a particular conveying channel delivers at the discharge end of the apparatus a continuous flow of eggs, whereas another conveying channel delivers at the discharge end not a single egg. This is in particular due to the fact that exchange of eggs between the different channels is not or hardly possible any longer. Another drawback of the known apparatus is that not all eggs have their longitudinal axes oriented in the same manner when discharged by the dosing apparatus. Moreover, in the known apparatus, thrust of eggs may easily occur through bridge formation before the inlet of the channels. When two eggs come to abut against the vertically upright elements at the upstream ends of the guiding elements, a bridge may easily be formed which closes the inlet of the channel. In that situation, no even distribution of the eggs over the conveying channels takes place any longer.

The object of the invention is to provide a dosing apparatus of the type mentioned in the opening paragraph without the aforesaid drawbacks.

To this end, according to the invention, the dosing apparatus is characterized in that a main surface of each of the guiding elements includes, with the conveying face part extending between the opposite guiding elements, an angle greater than 90°, enabling the articles to be gradually pushed upwards along the guiding elements, wherein at the inlet of the dosing apparatus, this dosing apparatus comprises one conveying channel, and wherein, viewed in the conveying direction, the number of conveying channels multiplies each time, so that at a discharge end of the dosing apparatus the width of the conveying channels at that location is such that, viewed in the conveying direction, the articles can only travel therein in file.

In this system, an unordered flow of eggs or like substantially round or ellipsoid articles will behave in the manner of water in a river. The eggs or like articles are controlled and guided with gentle compulsion by the inclined guiding elements. An article never bumps, against a stationary vertical wall, but can, due to the inclined walls of the guiding elements and the roundness of the article, always move upwards through tilting or running up. The bumping of articles against one another is prevented as much as possible by promoting that the flow of articles always remains in motion. As the number of conveying channels multiplies in each case, a gradual increase of the ordering of the articles is established. With such dosing apparatus, a capacity of at least 13,500 eggs or articles per row per hour can be obtained. Such capacity is more than one and a half times greater than the capacity of the dosing apparatuses for eggs that are currently available.

In order to cause the ordering of the unordered flow of eggs or like articles to increase gradually, according to a further elaboration of the invention, the width of each conveying channel, viewed in the conveying direction, gradually decreases over at least a part of the length of the conveying channel. With this gradual decrease of the width, the eggs or like articles will be pushed upwards against the oblique walls of the guiding elements, whereby the width of the article flow decreases and the articles gradually come to lie more in file.

To further promote the articles ending up in file, according to a further elaboration of the invention, the dosing apparatus is characterized by two endless conveyors that connect to each other and each form, over a part of the length of the dosing apparatus, the conveying face, with the first conveyor extending over at least a part of the dosing apparatus where the number of conveying channels is smaller than the number of conveying channels located at the discharge end, and the second conveyor extending over at least a part of the dosing apparatus where the number of conveying channels corresponds to the number of conveying channels located at the discharge end, while the conveying velocity of the first conveyor is lower than the conveying velocity of the second conveyor. According to a further elaboration of the invention, the conveying velocity of the first conveyor is maximally about 9 m per minute and the conveying velocity of the second conveyor is about 14 m per minute. At a conveying velocity of 9 m per minute, no collisions resulting in the breaking of an egg will occur, not even in an unordered flow of eggs. As in the unordered flow of eggs, more eggs are positioned side by side than at the discharge end of the dosing apparatus where only a specific number of ordered flows having the width of one egg are juxtaposed, approximately the same feed-through capacity is realized at the inlet and at the discharge end by virtue of the higher conveying velocity of the second conveyor.

Further elaborations of the invention are described and will hereinafter be specified on the basis of an exemplary embodiment, with reference to the accompanying drawings.

FIG. 1 is a top plan view of an exemplary embodiment of the dosing apparatus according to the invention;

FIG. 2 is a side elevational view of the dosing apparatus shown in FIG. 1;

Figure 3:
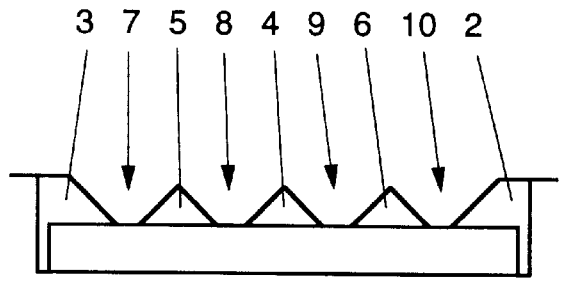
FIG. 3 is a sectional view taken on the line III—III of FIG. 1.
Figure 4:
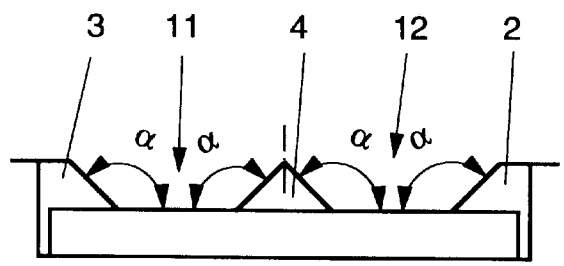
FIG. 4 is a sectional view taken on the line IV—IV of FIG. 1.
Figure 5:
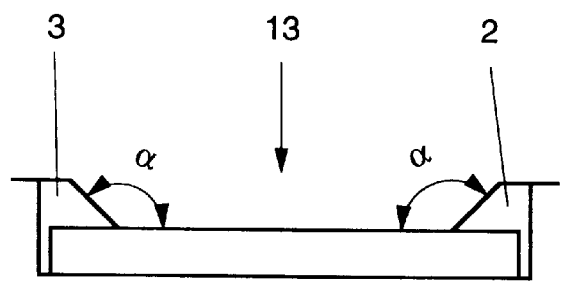
FIG. 5 is a sectional view taken on the line V—V of FIG. 1.
Figure 6:
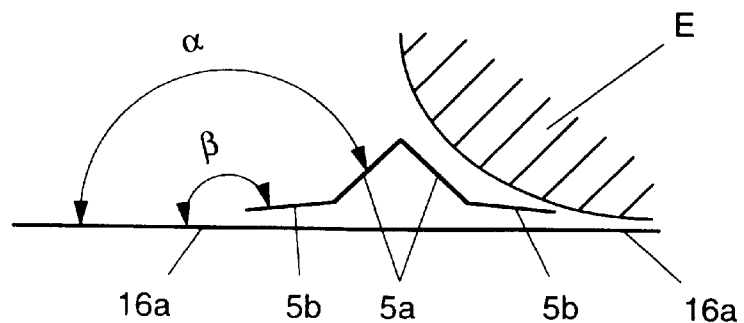
FIG. 6 is a sectional view taken on the line VI—VI of FIG. 1.

The dosing apparatus for eggs E shown in the exemplary embodiment, which apparatus is in fact also suitable for processing similar substantially round or ellipsoid articles, comprises a first endless conveyor 1 having a flat, substantially horizontally disposed conveying face 1a, and a second endless conveyor 16 likewise having a flat, substantially horizontally disposed conveying face 16a. Arranged above the conveyors 1, 16 are guiding elements 2,3,4,5,6, intended for ordering an unordered flow of eggs E into a number of ordered flows each having the width of one egg. Two opposite guiding elements 2,3; 2;4, 3,4; 3,5; 4,5; 4,6; 2,6 bound, together with a part of the conveying face 1a, 16a that extends between these guiding elements, a conveying channel, respectively 13;12;11;7;8;9;10. The conveying channel has a cross-sectional profile having a channel bottom and channel walls, the channel bottom being formed by the conveying face 1a, 16a, and the channel walls being formed by the two opposite guiding elements 2,3; 2,4; 3,4; 3,5; 4,5; 4,6; 2,6. A main surface of each of the guiding elements includes, with the conveying face part 1a, 16a extending between the opposite guiding elements, an angle α which according to the invention is greater than 90°, so that the eggs E can be gradually pushed upwards along the guiding elements. In the present exemplary embodiment, this angle α is about 135°. Although this angle is preferred in practice, the angle α may vary between 110° and 160°. The inlet 14 of the dosing apparatus comprises one conveying channel 13 and, viewed in the conveying direction T, the number of conveying channels doubles each time, so that at a discharge end 15 of the dosing apparatus the width of the conveying channels 7,8,9,10 is such at that location that, viewed in the conveying direction T, the eggs E can only travel therein in file. The channels formed between guiding elements 2, 3 and 4, upstream from the guiding elements 5 and 6 will be referred to as first channels; and the channels formed between guiding elements 3, 5, 4, 6 and 2 will be referred to as further channels.

To obtain a gradual ordering of the eggs, the width of each conveying channel 7–13 gradually decreases over at least a part of the length of the conveying channel, viewed in the conveying direction T. This is realized in that the upstream ends 4c,5c,6c,4,5,6 arranged between other guiding elements 2,3 gradually slope upwards from a point 4c,5c,6c adjacent the conveying face to a particular maximum guiding element height, while also, viewed in the conveying direction T, the distance between two opposite guiding elements 2,3; 2,4; 3,4; 3,5; 4,5; 4,6; 2,6 gradually decreases. In the present exemplary embodiment, the gradual decrease of the conveying channel width is deviated from at one point only. Indeed, directly upstream of the position where an upstream end 5c, 6c of the guiding elements 5,6 is located which are each included between two opposite guiding elements 3,4; 2,4, the distance L2 between the two opposite guiding elements 3,4; 2,4 slightly increases, viewed in the conveying direction T. This is effected in particular in order to slightly reduce the extent of accumulation of the eggs E, at this point, so that in the flow of eggs space is created for inserting the intermediate guiding elements 5, 6. Moreover, the eggs E are thus prevented from rolling over the intermediate guiding elements 5, 6, which would have an adverse effect on the ordering action of the guiding elements 5, 6.

To minimize the chance of bridge formation of eggs E before in inlet of a conveying channel, at least the upstream ends 5c, 6c of the guiding elements 5, 6 arranged between two other guiding elements 3,4; 2,4 perform a horizontal, reciprocating movement, represented by the arrow marked by the letter M directed perpendicularly to the conveying direction. In the present exemplary embodiment, viewed in conveying direction T, only the last-added guiding elements 5,6, bounding the conveying channels 7,8,9,10 at the discharge end 15, perform this movement M. The travel of the reciprocating movement M at the upstream ends of the guiding elements 5, 6 is about 4 mm, and the frequency of the movement is about 3 Hz.

Figure 7:
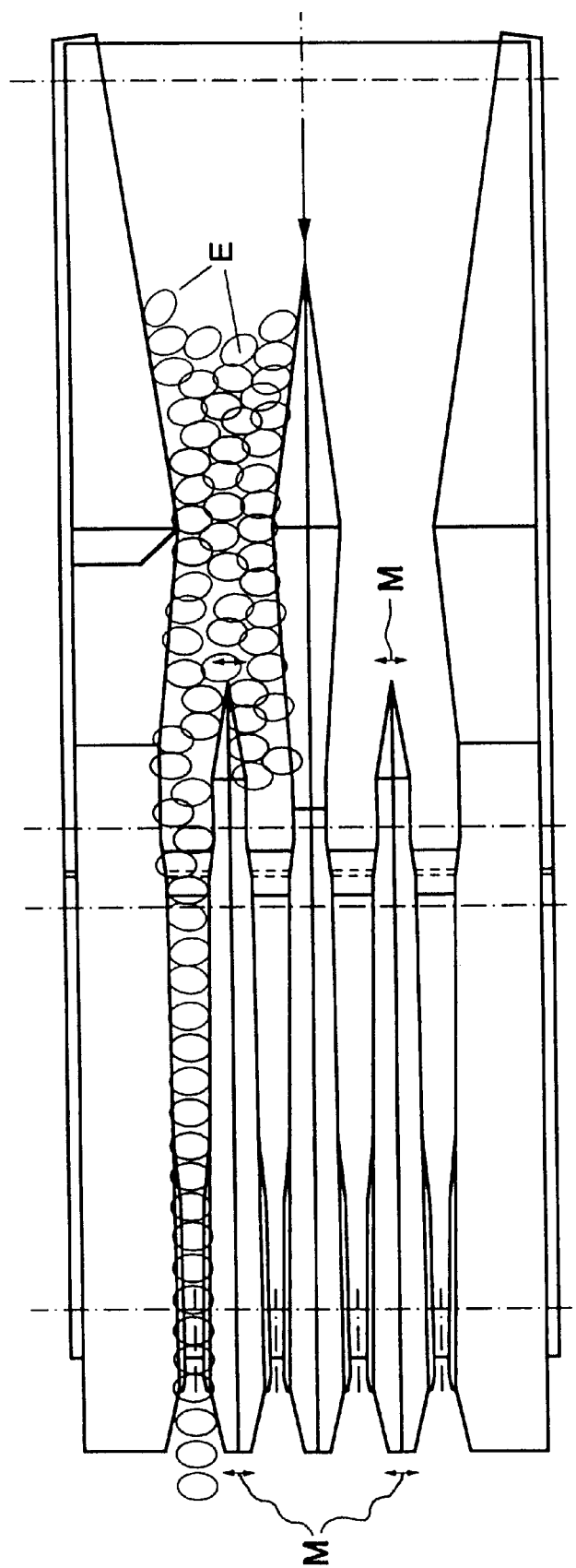
FIG. 7 is a top plan view of the dosing apparatus shown in FIG. 1, showing a possible distribution of the eggs.

As is clearly shown in FIG. 7, the eggs E in the upstream part of the channels 7,8,9,10 are not yet completely ordered into one row extending in the conveying direction. In order to effect this ordering, the guiding elements 2,3,4,5,6 converge at the discharge end 15, viewed from the upstream end in the conveying direction T, with the converging angle for each guiding element being about 0.75°. Because of this very slight converging angle, the eggs are forced into the file position in a highly gradual manner.

Moreover, adjacent the discharge end 15, the downstream parts of the guiding elements 2,3,4,5,6 are provided with a bent profile. The main surface of a first guiding element part 5b located adjacent the conveying face 16a includes with the conveying face 16a an angle β greater than about 135°. The angle α between the main surface of a second guiding element part 5a connecting to the first guiding element part and the conveying face 16a is about 135°. As a result of the bent profile, both large and small eggs E automatically orient themselves with their main longitudinal axes perpendicularly to the conveying direction T of the dosing apparatus. Moreover, owing to the bent profile, it is provided that even small eggs sit in file, viewed in the conveying direction. Hence, at the discharge end, the eggs E are not merely in file in a number of separate tracks, but the eggs E are also equally oriented, which enables them to be readily transferred onto for instance a roller conveyor 19 that can connect to the discharge end 15 of the dosing apparatus. The conveying direction of the roller conveyor 19 is preferably so that the eggs, when transferred from the dosing apparatus onto the roller conveyor 19, undergo a change of direction not greater than 20°. As a result, the velocity of the eggs is maintained as much as possible.

As observed hereinabove, in the present exemplary embodiment the conveying face 1a, 16a is formed by two endless conveyors 1, 16. The first conveyor 1 extends over the part of the dosing apparatus where the number of conveying channels 11,12,13 is smaller than the number of conveying channels 7,8,9,10 located at the discharge end 15 of the dosing apparatus. The second conveyor 16 extends over the part of the dosing apparatus where the number of conveying channels 7,8,9,10 corresponds to the number of conveying channels 7,8,9,10 located at the discharge end 15. The conveying velocity of the first conveyor 1 is lower than the conveying velocity of the second conveyor 16 in order to keep the feed-through capacity of the dosing apparatus at the inlet 14 approximately equal to the feed-through capacity at the discharge end 15. The conveying velocity of the first conveyor is maximally about 9 m per minute, at which velocity, even in an unordered flow, no breaking of eggs E will occur. The conveying velocity of the second conveyor will in that case be about 14 m per minute in order to keep the feed-through capacities at the inlet 14 and the discharge end 15 of the dosing apparatus approximately equal.

Under some conditions, the feed of eggs at the inlet 14 of the apparatus can be so great that the dosing apparatus cannot process the eggs at the normal conveying velocity of the first conveyor 1. In that case, a substantial thrust occurs whereby the eggs are pushed up along the guiding elements 2,3,4 and the gradual ordering of the unordered flow does not take place in the desired manner. To overcome this problem, according to a further elaboration of the invention, a light beam coming from a light source 17 shines, at least at the location of the guiding element 4 dividing the single unordered flow of eggs E into two separate flows of eggs, above the conveying path right across the dosing apparatus in an electronic eye 18. The electronic eye 18 is connected to a control adapted to reduce the feed velocity of at least the first conveyor 1 if the light beam is interrupted for some time. The feed velocity can for instance be reduced to zero. The interruption of the light beam should last some time to prevent the feed velocity of the first conveyor 1 from already being reduced when an egg E standing on its tip passes the light beam.

For a simple cleaning of the dosing apparatus, it is particularly favourable when the guiding elements can readily be disassembled. For the purpose of cleaning, the guiding elements 2,3,4,5,6 can then be temporarily be removed from the conveying face 1*a*, 16*a* and re-assembled after the cleaning thereof and of the conveying face 1*a*, 16*a*.

It is understood that the invention is not limited to the exemplary embodiment described, but that various modifications are possible within the framework of the invention. For instance, the number of channels may of course vary and the first subdivision may also be a triplication or multiplication, rather than a doubling.

We claim:

1. A dosing apparatus for rounded articles comprising:
   an endless conveyor having a generally flat, substantially horizontal conveying surface extending from an inlet end to a discharge end, said endless conveyor comprising a pair of endless conveyors arranged one following the other; and
   a plurality of guiding elements extending in the direction of travel of the endless conveyor and forming between them a plurality of channels,
   at least one first guiding element dividing the conveyor surface near the inlet end into a plurality of first channels downstream from the inlet end, and at least two second guiding elements dividing each of each first channels into a plurality of further channels downstream from the first channel, the sides of the first and second guiding elements forming an angle of greater than 90° with the conveyor surface, the articles at the discharge end being confined to travel in a single file, the first conveyor extending under the inlet end and at least a portion of said first channels and the second conveyor extending under at least said further channels, the first conveyor being constructed to have a velocity less than that of the second conveyor.

2. A dosing apparatus according to claim 1, wherein the width of the further channels at the bottoms thereof, across the conveyor surface is less than the width of the articles being conveyed, such that the articles are generally pushed up along the channel walls as the articles move along their respective further channels.

3. A dosing apparatus according to claim 2, wherein the width of the further channels decreases over at least a part of their length in the direction of travel.

4. A dosing apparatus according to claim 3, wherein the width of the first channels decrease over at least a part of their length in the direction of travel.

5. A dosing apparatus according to claim 4, wherein the width of the inlet end upstream from the first channels decreases over at least a part of its length in the direction of travel.

6. A dosing apparatus according to claim 1, wherein the first conveyor is constructed to have a maximum speed of approximately 9 meters per minute and the second conveyor is designed to have a maximum speed of approximately 14 meters per minute.

7. A dosing apparatus according to claim 1, wherein the angle formed by the channel walls of the first and further channel is approximately 135°.

8. A dosing apparatus for rounded articles comprising:
   an endless conveyor having a generally flat, substantially horizontal conveying surface extending from an inlet end to a discharge end; and
   a plurality of guiding elements extending in the direction of travel of the endless conveyor and forming between them a plurality of channels,
   at least one first guiding element dividing the conveyor surface near the inlet end into a plurality of first channels downstream from the inlet end, and at least two second guiding elements dividing each of each first channels into a plurality of further channels downstream from the first channel, at least the upstream end of the second guiding elements being movable horizontally in a reciprocating movement substantially perpendicular to the direction of travel, the sides of the first and second guiding elements forming an angle of greater than 90° with the conveyor surface and wherein, at the discharge end, the articles are confined to travel in a single file.

9. A dosing apparatus according to claim 8, wherein only the second guiding elements are movable horizontally to reciprocate at the discharge end thereof in a direction substantially perpendicular to the direction of travel.

10. A dosing apparatus according to claim 8, wherein the reciprocating movement of the second guiding elements at the upstream end of the further channels is about 4 mm and movable at a frequency of approximately 3 Hz.

11. A dosing apparatus for rounded articles comprising:
    an endless conveyor having a generally flat, substantially horizontal conveying surface extending from an inlet end to a discharge end; and
    a plurality of guiding elements extending in the direction of travel of the endless conveyor and forming between them a plurality of channels,
    at least one first guiding element dividing the conveyor surface near the inlet end into a plurality of first channels downstream from the inlet end, and at least two second guiding elements dividing each of each first channels into a plurality of further channels downstream from the first channel, the channel walls at a downstream portion of the further channels being formed with a lower first part and an upper second part, the lower first part forming an angle of greater than 135° with the conveyor surface and the upper second part forming an angle of approximately 135° with the conveyor surface, the sides of the first and second guiding elements forming an angle of greater than 90° with the conveyor surface and wherein, at the discharge end, the articles are confined to travel in a single file.

12. A dosing apparatus according to claim 11, wherein the upstream ends of the second guiding elements forming the further channels gradually slope upwards from a point at the upstream end thereof to a maximum height.

13. A dosing apparatus according to claim 12, wherein the distance between the channels walls of the first and further channels gradually decreases in the direction of travel of the conveyor.

14. A dosing apparatus for rounded articles comprising:
    an endless conveyor having a generally flat, substantially horizontal conveying surface extending from an inlet end to a discharge end; and
    a plurality of guiding elements extending in the direction of travel of the endless conveyor and forming between them a plurality of channels,
    at least one first guiding element dividing the conveyor surface near the inlet end into a plurality of first channels downstream from the inlet end, and at least two second guiding elements dividing each of each first channels into a plurality of further channels downstream from the first channel, a portion of the first channels immediately upstream from the further channels increasing slightly in width up to a beginning of the further channels, the sides of the first and second guiding elements forming an angle of greater than 90° with the conveyor surface and wherein, at the discharge end, the articles are confined to travel in a single file.

15. A dosing apparatus for rounded articles comprising:

an endless conveyor having a generally flat, substantially horizontal conveying surface extending from an inlet end to a discharge end; and a plurality of guiding elements extending in the direction of travel of the endless conveyor and forming between them a plurality of channels, at least one first guiding element dividing the conveyor surface near the inlet end into a plurality of first channels downstream from the inlet end, and at least two second guiding elements dividing each of each first channels into a plurality of further channels downstream from the first channel, the sides of the first and second guiding elements forming an angle of greater than 90° with the conveyor surface, the channel walls at a downstream end of the further channels converging towards each other at an angle of about 0.75°, and wherein, at the discharge end, the articles are confined to travel in a single file.

16. A dosing apparatus according to claim 15, wherein the width of the further channels at the bottom thereof, across the conveyor surface is less than the width of the articles being conveyed, such that the articles are generally pushed up along the channel walls as the articles move along their respective further channels.

17. A dosing apparatus according to claim 16, wherein the width of the first channels decrease over at least a part of their length in the direction of travel.

18. A dosing apparatus according to claim 17, wherein the width of the inlet end upstream from the first channels decreases over at least a part of its length in the direction of travel.

19. A dosing apparatus for rounded articles comprising:

an endless conveyor having a generally flat, substantially horizontal conveying surface extending from an inlet end to a discharge end, a plurality of guiding elements extending in the direction of travel of the endless conveyor and forming between them a plurality of channels, at least one first guiding element dividing the conveyor surface near the inlet end into a plurality of first channels downstream from the inlet end, and at least two second guiding elements dividing each of each first channels into a plurality of further channels downstream from the first channel, the sides of the guiding elements forming the channel walls of the first channels and of the further channels forming an angle of greater than 90° with the conveyor surface and wherein at the discharge end, the articles are confined to travel in a single file; and a sensor located in the vicinity of the first channels for detecting whether any articles have been raised up a certain distance above the conveyor surface, said sensor being operable to reduce the feed velocity of the conveyor upon sensing of such articles.

20. A dosing apparatus according to claim 19, including a light beam shining across the conveyor a predetermined distance above the surface thereof and said sensor positioned to sense said light beam, which light beam is interpreted when articles are raised up to a predetermined height.

21. A dosing apparatus according to claim 19, wherein the guiding elements are arranged to be disassembled from the conveyor.

* * * * *